United States Patent [19]

Landers et al.

[11] Patent Number: 4,773,461

[45] Date of Patent: Sep. 27, 1988

[54] RUN-FLAT INSERT FOR A TIRE AND RIM ASSEMBLY

[75] Inventors: Samuel P. Landers, Uniontown; Arthur A. Goldstein, Mayfield Village, both of Ohio

[73] Assignee: The Goodyear Tire & Rubber Company, Akron, Ohio

[21] Appl. No.: 5,493

[22] Filed: Jan. 20, 1987

[51] Int. Cl.$^4$ ............................................. B60C 17/04
[52] U.S. Cl. ......................................................... 152/520
[58] Field of Search ....................... 152/520, 158, 316

[56] References Cited

U.S. PATENT DOCUMENTS

| | | | |
|---|---|---|---|
| 1,215,577 | 2/1917 | Reeder | 152/520 |
| 3,250,310 | 5/1966 | Johnson | 152/158 |
| 3,367,381 | 2/1968 | Aghnides | 152/158 |
| 4,163,466 | 8/1979 | Watts | 152/158 |
| 4,293,016 | 10/1981 | Bible et al. | 152/520 |

*Primary Examiner*—Michael Ball
*Attorney, Agent, or Firm*—R. J. Slattery, III

[57] ABSTRACT

This specification discloses a run flat insert for use with a tire and rim assembly. The insert comprises an annular band having radially inner and outer surfaces and a plurality of circumferentially spaced supporting legs extending toward the axis of rotation of the tire from the radially inner surface of the annular band. Preferably, the supporting legs are inclined with respect to the axis of rotation of the insert; half are inclined in one direction away from the mid-circumferential plane and the other half are inclined in the opposite direction away from such plane.

The circumferential spacing between each supporting leg and the next circumferentially adjacent supporting leg inclined in the same axial direction is at least thirty percent of the circumferential width of the supporting legs at the radially inner ends.

11 Claims, 6 Drawing Sheets

RUN-FLAT INSERT FOR A TIRE AND RIM ASSEMBLY

BACKGROUND OF THE INVENTION

The invention relates to a tire and rim assembly, and more specifically to a run-flat insert that enables a tire and rim assembly to support a vehicle when the tire is deflated.

Various structures have been suggested for use inside a pneumatic tire to support the weight of a vehicle in the event that the tire is deflated. In this specification and the appended claims, such a structure is referred to as a "run-flat insert".

Prior art run-flat inserts have often been made in rigid segments that are fitted around the circumference of a rim, because the structures could not be elastically deformed to fit over the flanges of a rim or inside of a tire; an example of an insert of this type is illustrated in U.S. Pat. No. 4,163,466. Other prior art run-flat inserts have had a separate air chamber, sealed from that of the tire, to enable the insert to carry the load when the tire is deflated; an example of this type of insert is shown in U.S. Pat. No. 2,224,066.

The present invention provides a run-flat insert that is elastically deformable, allows greatly simplified mounting on a rim, is non-pneumatic and therefore is not subject to air-loss failures characteristic of air-chamber run-flat inserts.

There is provided in accordance with one aspect of the invention a run-flat insert for use with a tire and rim assembly. The run-flat insert is made from an elastically deformable polymeric (plastic or elastomeric) material and comprises a structure including an annular band and at least eight, and preferably more circumferentially spaced supporting legs attached to and extending radially inwardly from the radially inner surface of the annular band. In the preferred form, the supporting legs are integral with the annular band, the supporting legs are inclined with respect to the axis of rotation of the run-flat insert; half of the supporting legs are inclined in one direction away from the mid-circumferential plane of the insert and the other half are inclined in the opposite direction away from such plane. Supporting legs on opposite sides of the run-flat insert are inclined outwardly with respect to its mid-circumferential plane. The spacing between adjacent supporting legs on the same side of the mid circumferential plane is at least 30 percent of the circumferential width of a supporting leg at its radially inner end.

There is provided in accordance with another aspect of the invention an assembly of a rim, tire, and run-flat insert. The assembly has a multi-piece rim with two cylindrical coaxial rim members. Each rim member has a radially outer surface with a flange portion formed at the axially outermost end. The assembly also has a tubeless pneumatic tire mounted on the multi-piece rim. The tire has an inner cavity and a pair of bead portions. One of the bead portions is adjacent to each flange portion of the multi-piece rim. With a run-flat insert disposed within the inner cavity of the tire, the insert has an annular band with radially inner and outer surfaces. The radially outer surface has a predetermined maximum diameter, and at least four pairs of circumferentially spaced supporting legs extending radially inwardly from the radially inner surface of the annular band. One-half of the supporting legs are inclined with respect to the axis of rotation of the assembly in one axial direction and one-half of the supporting legs are inclined with respect to the axis of rotation of the assembly in the opposite axial direction. Each supporting leg has a radially outer surface that is adjacent to a bead portion of the tire and a radially inner end that is adjacent to the radially outer surface of one of the rim members. The circumferential spacing between each supporting leg and the adjacent supporting leg inclined in the same direction is at least 30 percent of the circumferential width of a supporting leg at its radially inner end.

BRIEF DESCRIPTION OF THE DRAWINGS

The invention, both as to its structure and manner of operation, may best be understood by reference to the following description, taken in accordance with the accompanying drawings in which.

DETAILED DESCRIPTION

Figure 1:
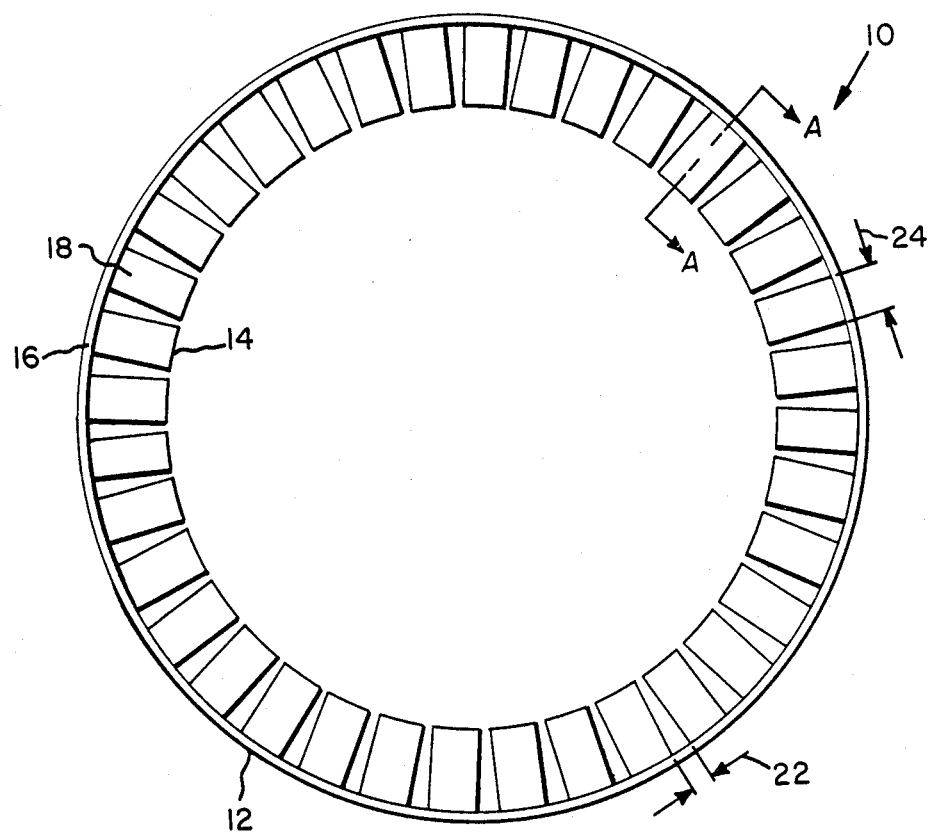
FIG. 1 is a side elevation view of a run-flat insert according to one aspect of the invention.

In FIG. 1, there is shown a side elevation view of a run-flat insert 10 according to one aspect of the invention. The run-flat insert shown in FIG. 1 is intended for use with a tire and rim assembly. An annular band 12 has radially inner 14 and outer 16 surfaces, and a plurality of circumferentially spaced supporting legs 18 extend toward the axis of rotation from the radially inner surface of the annular band. At least eight supporting legs, and preferably more, are believed to be the minimum necessary to support an uninflated tire. If oppositely inclined supporting legs are in circumferentially adjacent positions, then at least four pairs of such legs are the minimum expected to provide runflat tire support.

Figure 2:
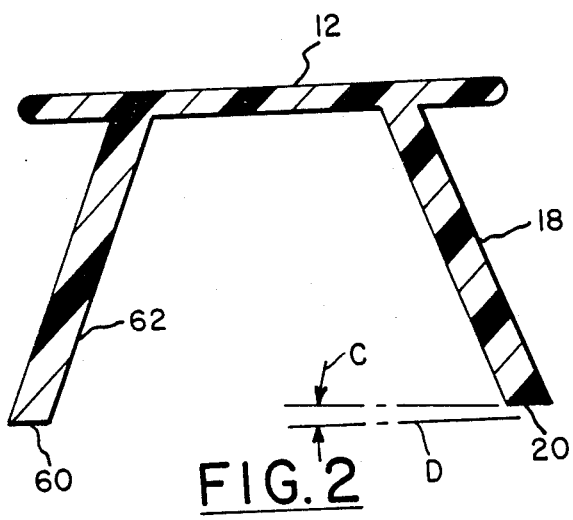
FIGS. 2-4 are enlarged radial cross-sectional views of run-flat inserts according to various embodiments of the invention, the sections being taken along line A—A of FIG. 1.

The structure of a run-flat insert 10 according to the invention may be better understood by reference to FIG. 2 in conjunction with FIG. 1. One-half of the supporting legs 18 are inclined with respect to the axis of rotation of the run-flat insert and the other half of the supporting legs also are inclined with respect to such axis but in the opposite direction.

The supporting legs for the run-flat insert are made of an elastically deformable plastic or an elastomeric polymeric material, such as rubber, loaded rubber, rubber having aromatic polyamid pulp dispersed therein, urethane or loaded urethane. The material could also be a nylon. The material to be used for the annular band for the insert could be steel, rubber, urethane, aromatic polyamide, polyester or a nylon. The stiffness modulus for the material used for the annular band should be such that it has less than one percent circular growth at operating speed.

As used herein and in the attached claims, "axial" and "axially" refer to directions that are parallel to the axis of rotation of a run-flat insert or a tire, rim, and run-flat insert assembly. As used herein and in the attached claims, "radial" and "radially" refer to directions that are perpendicular to the axis of rotation of a run-flat insert or tire, rim, and run-flat insert assembly.

As used herein, the "mid-circumferential" plane 70 of a tire or run-flat insert is a plane that is perpendicular to the axis about which the tire or insert rotates and is located midway between the sidewalls of the tire or lateral edges of the annular band of the insert.

The supporting legs 18 have radially inner ends 20, and the circumferential spacing, as measured at 22, between each supporting leg and the next circumferentially adjacent supporting legs inclined in the same direction relative to the axis of rotation is at least 30 percent of the circumferential width, as measured at 24, of the supporting legs at the radially inner ends. The supporting leg 18 has a radially inner surface that is inclined at an angle C which is between 13° and 17° with respect to a line D parallel to the axis of rotation of the run-flat insert as shown in FIG. 2.

In the embodiment illustrated in FIG. 2, the supporting legs are arranged in axially aligned pairs with each pair 46 having a supporting leg inclined outwardly from the mid-circumferential plane.

Figure 3:
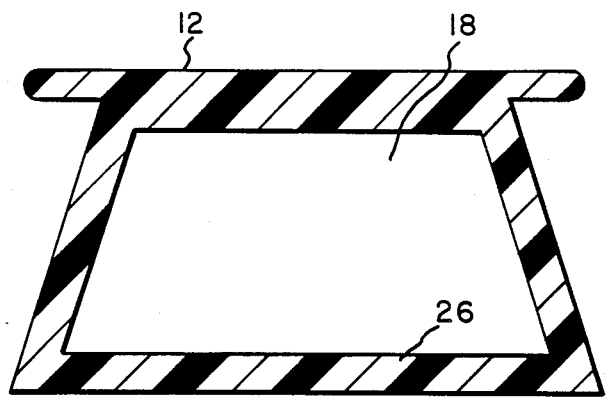

In the FIG. 3 embodiment of the invention, the run-flat insert further comprises an axially oriented support member 26 extending between axially aligned supporting legs 18. The axially oriented support member is adjacent to the radially inner surface 14 of the annular band 12.

Figure 4:
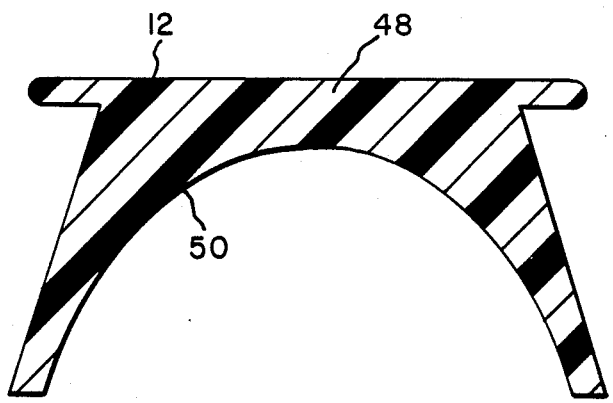

In FIG. 4, the axially oriented support member extending between the supporting legs of each axially aligned pair of supporting legs 48 is an arch 50. The run-flat insert illustrated in FIG. 4 is the preferred embodiment of the invention.

Figure 5:
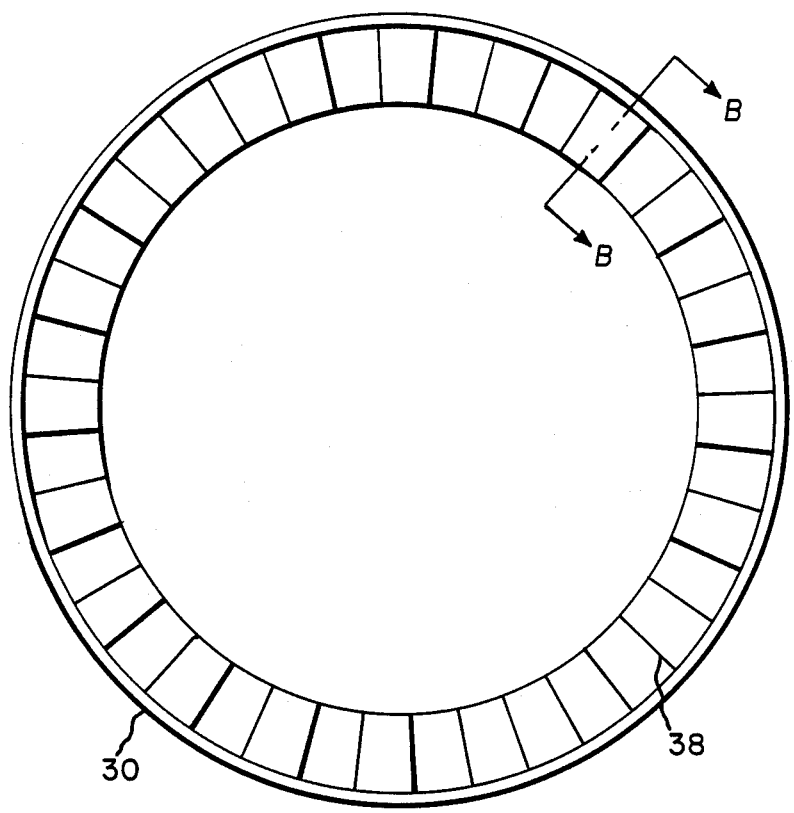
FIG. 5 is a side elevation view of a run-flat insert according to another aspect of the invention.
Figure 6:
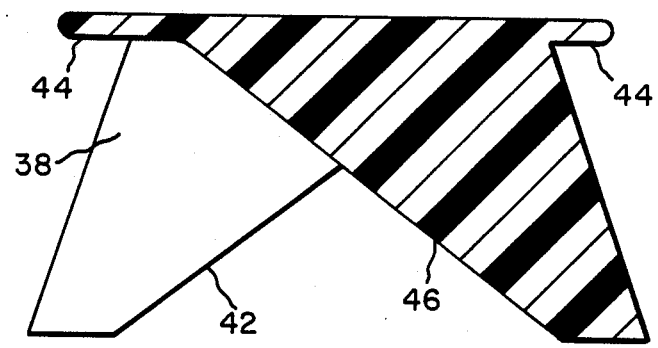
FIG. 6 is an enlarged radial cross-sectional view of a run-flat insert, the section being taken along the line B—B of FIG. 5.

A run-flat insert in accordance with another aspect of the invention is illustrated in FIGS. 5 and 6. The run-flat insert 30 according to this aspect of the invention has an annular band 44 with radially inner and outer surfaces 42, 46, and a plurality of circumferentially spaced supporting legs 38 extending toward the axis of rotation from the radially inner surface of the annular band 44. One-half of the supporting legs 38 are inclined in one direction with respect to the axis of rotation of the run-flat insert 30, and the other half of the supporting legs 38 are inclined in the opposite direction with respect to such axis. The supporting legs 38 have radially inner ends 44, and the circumferential spacing between adjacent supporting legs 38 inclined in the same direction (on the same side of the mid-circumferential plane of the insert) is at least 30 percent of the circumferential width of a supporting leg 38 at radially inner end 44. The supporting legs 38 have radially inner surfaces that are inclined at an angle of between 13° and 17° with respect to a line parallel to the axis of rotation of the run-flat insert. A run-flat insert in accordance with this aspect of the invention has equally-spaced supporting legs 38 that are not axially aligned. While the structure of a run-flat apparatus in accordance with this aspect of the invention differs from the embodiments having supporting legs 18 arranged in axially aligned pairs, as described above with respect to FIGS. 2 to 4, run-flat inserts manufactured in accordance with each of the embodiments described herein function in the same manner.

Figure 7:
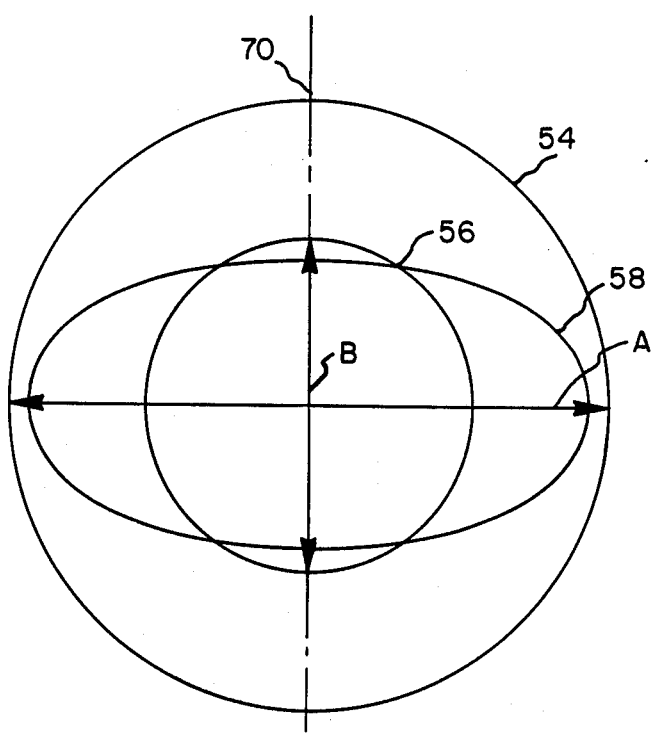
FIG. 7 is a schematic illustration used to explain how the outside diameter of a run-flat insert according to the invention is determined.

The annular band 12 of a run-flat insert according to any of the embodiments of the invention has a radially outer surface with a predetermined maximum diameter that facilitates the insertion of the run-flat insert into a tire. FIG. 7 is a schematic representation used to explain a preferred method for determining the outside diameter of the annular band of the run-flat insert. The large circle 34 represents the inner cavity of an uninflated tire at the mid-circumferential plane 70 of the tire. The small circle 56 is concentric with the large circle, and represents the beads of the tire. The ellipse 58 represents the radially outer surface of the annular band of a run-flat insert that has been distorted from its normally circular shape to facilitate its insertion into the tire. It may be observed that the major axis A of the ellipse 58 is slightly less than the diameter of the large circle 54, and the minor axis B of the ellipse 58 is slightly less than the diameter of the small circle 56, to allow some clearance when the run-flat insert 10 is inserted into the tire. The predetermined maximum diameter D of the radially outer surface of the annular band of a run-flat insert 12 according to the invention is:

$$D = (A^2 + B^2)/2$$

wherein A is the inside diameter of the inner cavity of an unmounted tire at the mid-circumferential plane of the tire less 25.4 millimeters, and B is the nominal inside diameter of the bead portions of the tire less 12.7 millimeters. The subtraction of 25.4 millimeters from the diameter of the cavity and 12.7 millimeters from the diameter of the bead portions provides the clearance that has been discussed. Therefore, a tire with an inner cavity having an inside diameter of 635 millimeters (25 inches) and bead portions with a nominal diameter of 406.4 millimeters (16 inches) should be used with a run-flat insert 10 according to the invention with an annular band 12 having a radially outer surface with a maximum diameter of 513.13 millimeters (20.202 inches).

Figure 8:
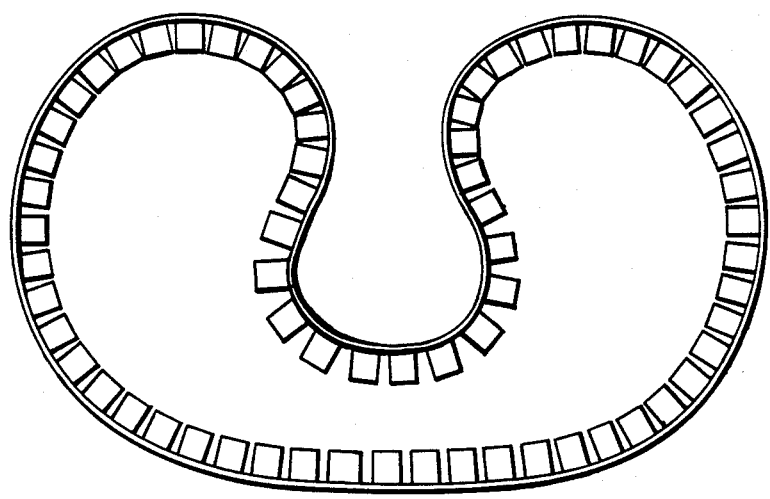
FIG. 8 is a side elevation view of a run-flat insert according to the invention which has been deformed to facilitate its insertion into a tire.

FIG. 8 is a side elevational view of a run-flat insert 10 according to the invention which has been deformed from a circular shape to facilitate its insertion into a tire. It was found in practice that the run-flat insert 10 may be placed inside of a tire most expediently by deforming the run-flat insert 10 into a kidney shape. The circumferential spacing between each support column 18 and the next circumferentially adjacent supporting legs 18 inclined in the same axial direction, as described above, can be significant in the function of the run-flat insert. If the spacing is less than 30 percent of the circumferential width of the supporting legs at their radially inner ends, deformation of the run-flat insert 10 may be too restricted and, as a result, it may not be possible to install a suitable run-flat insert in a given tire, even though a run-flat insert has a predetermined outside diameter as determined by the above equation.

Figure 9:
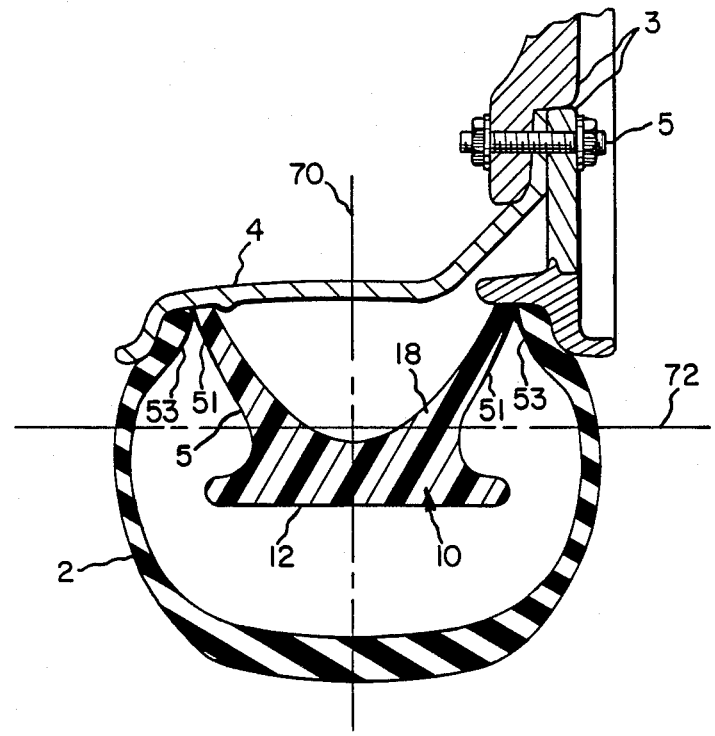
FIG. 9 is a radial cross-sectional view of a tire and rim assembly with a run-flat insert according to one aspect of the invention inserted therein, and the tire inflated.

FIG. 9 is a radial cross-sectional view of a tire 2 and rim assembly 4 with a run-flat insert 10 according to one aspect of the invention inserted therein. The assembly is manufactured by first inserting the run-flat insert 10 into a tire 2 in the manner described in the preceding paragraph, then mounting the tire 2 and run-flat insert 10 upon a rim 4. The rim 4 used in manufacturing an assembly according to the invention is preferably a multi-piece rim having two generally cylindrical coaxial rim members, each rim member having a radially outer surface with a flange portion formed at an axially outermost end thereof. The rim shown in FIG. 9 has the rim members 3 fastened together by a means for attachment, such as a bolt 5. However, it is understood that an assembly according to the invention may have a rim with a configuration other than that shown in FIG. 9. The assembly may further comprise a means for inflation, such as an inflation valve assembly that passes through an opening in one of the rim members.

In FIG. 9 each supporting leg 18 has its axially outer surface 5, contoured to be complimentary to the axially inner surface 53 of the bead portion of the tire 2. The outer surface 5 and the axially inner surface 53 are snugly fitted against the inside surface of the rim 4. The surface contact of the supporting legs axially outer surface 31 with the tire's axially inner surfaces 53 assures that the run-flat insert 12 stays securely mounted inside the tire 2 when used on a motor vehicle.

A tubeless pneumatic tire is mounted on the multi-piece rim. The tire has an inner cavity and a pair of bead portions, and has one of the bead portions located adjacent to each flange portion of the multi-piece rim. It is understood that a tubeless tire used in making an assembly according to the invention may be either of the radial or bias varieties. Furthermore, it is understood that a tubeless tire used in making an assembly according to the invention is not restricted to any particular range of sizes, or applications, e.g. passenger cars, trucks, busses, or aircraft.

A run-flat insert 10, as described above, is disposed within the inner cavity of the tire. The run-flat insert comprises an annular band 12 having radially inner and outer surfaces, with the radially outer surface having a predetermined maximum diameter. At least eight (four pairs of and preferably considerably more) circumferentially spaced supporting legs 18 extend radially inwardly from the radially inner surface of the annular band 12. One-half of the supporting legs 18 are inclined with respect to the axis of rotation of the assembly and the other half of the supporting legs are inclined with respect to such axis in the opposite direction. Each leg 38 has a radially outer surface 51 that is adjacent to a bead portion of the tire 2, and a radially inner end 55 that is adjacent to the radially outer surface 57 of one of the rim members. The circumferential spacing between each supporting leg 18 and the next circumferentially adjacent legs located on the same side of the mid-circumferential plane 70 of the assembly is at least 30 percent of the circumferential width of a supporting leg 38 at its radially inner end 60. The radially inner end 60 of each supporting leg 38 has a radially inner surface 62 that is inclined axially and radially outwardly at an angle of between 13° and 17° with respect to a line 72 parallel to the axis of rotation of the run-flat insert. The axial inclination of the supporting legs 38 should be selected by the designer with respect to the suspension system of the vehicle with which the assembly is intended to be used.

Figure 11:
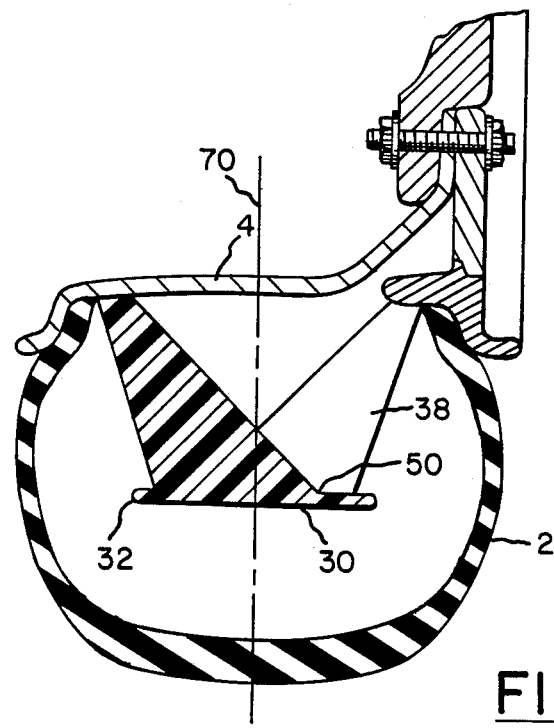
FIG. 11 is a radial cross-sectional view of a tire and rim assembly with a run-flat insert according to another aspect of the invention inserted therein, and the tire inflated.

In FIG. 11, there is shown a radial cross-sectional view of an assembly of a tire 2, rim 4, and run-flat insert 30 according to the invention wherein the supporting legs of the run-flat insert are not axially aligned. However, the assembly shown in FIG. 9 has the supporting legs of the run-flat insert arranged in axially aligned pairs, with each pair having one of its supporting legs 38 inclined away from the mid-circumferential plane 70 in each axial direction. The run-flat insert of the assembly may further comprise an axially oriented support member extending between the supporting legs of each axially aligned pair of supporting columns, with the support member being adjacent to the radially inner surface of the annular band. Most preferably, as shown in FIG. 9, the axially oriented support members of the run-flat insert are arches 50.

Figure 10:
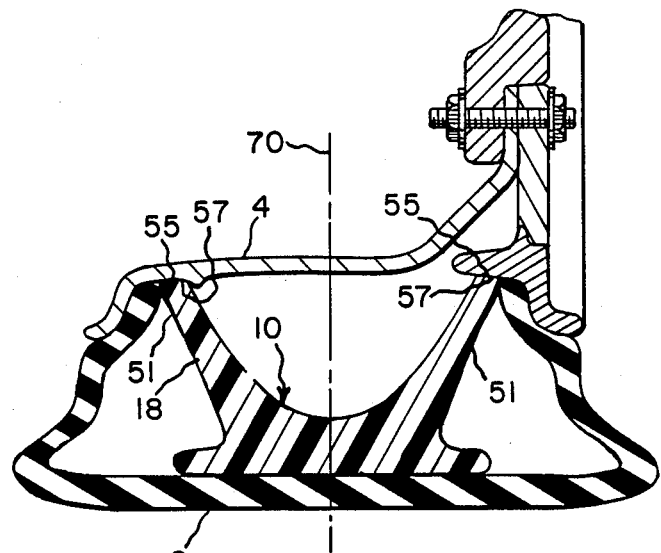
FIG. 10 is another radial cross-sectional view of the assembly shown in FIG. 9 with the tire deflated.

In FIG. 10, there is shown another radial cross-sectional view of the assembly shown in FIG. 9, with the tire deflated. In the event that there is a loss of inflation pressure from the assembly, the run-flat insert 30 functions to support the weight of the vehicle, and to maintain the bead portions of the tire in position adjacent to the respective flange portions of the multi-piece rim 4.

The axial width of the annular band 32 of the run-flat insert 30 is preferably greater than 60 percent of the axial width of a footprint of a tire used in the assembly when the tire is mounted on the rim. That is, the axial width as it is measured when the tire is in the uninflated condition and not subjected to a load which would cause the inner cavity of the tire 2 to have a radial height at the mid-circumferential plane 70 of the tire 2 that is equal to the predetermined diameter of the radially outer surface of the annular band 32. As used herein, the "footprint" of a tire is the shape and area of that portion of the tire in contact with the ground at a given inflation pressure and load. Put another way, the axial width of the annular band 32 of a run-flat insert according to the invention is preferably not less than the axial width of a footprint of the tire with which the run-flat insert is intended to be used as determined by: (a) manufacturing a tire and rim assembly by mounting the tire on a rim of the type to be used in manufacturing an assembly according to the invention, without inflating said tire; (b) applying a load to the tire and rim assembly to cause the inner cavity of the tire 2 to have a radial height at the mid-circumferential plane of the tire 2 that is equal to the predetermined maximum diameter of the radially outer surface of the annular band of the run-flat insert; and then (c) measuring the maximum axial width of the footprint of the tire.

Figure 12:
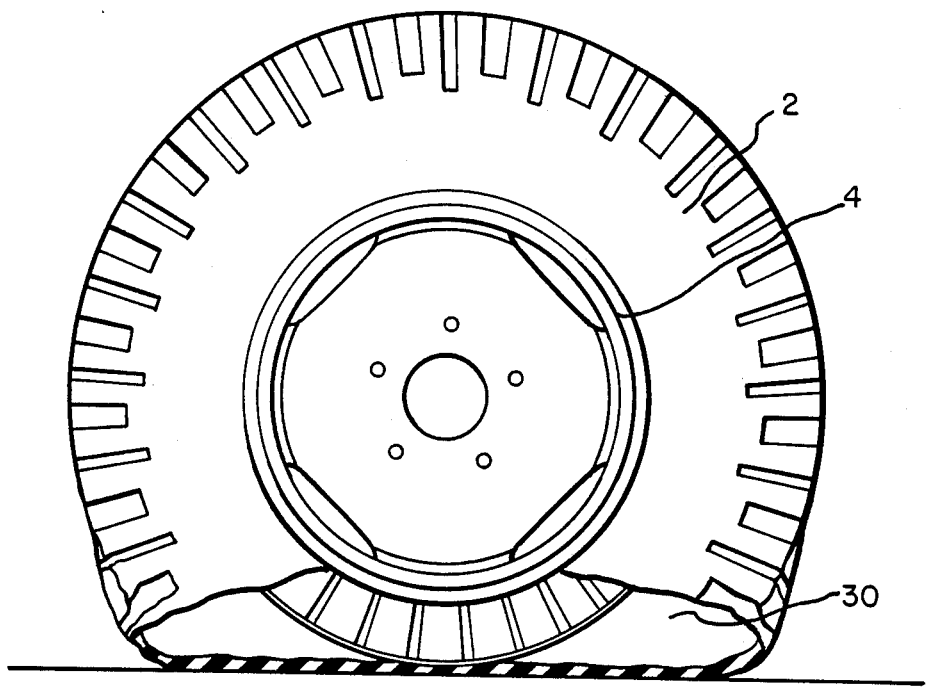
FIG. 12 is a side elevation view of a tire and rim assembly with a run-flat insert according to the invention inserted therein, partially cut away to show the run-flat insert.

FIG. 12 is a side elevational view, partially cut away, of a tire and rim assembly with a run-flat insert according to the invention. In order that the operator of the vehicle on which the assembly is mounted upon may maintain control of the vehicle and have a smoother ride in the event that inflation pressure in the assembly is lost, it is desirable to have a sufficient number of supporting legs spaced as disclosed herein, such that the transfer of load from one supporting leg to the next adjacent supporting leg is gradual rather than abrupt. It is believed that for an embodiment of the run-flat insert 30 having supporting legs that are not axially aligned, the number of supporting legs should be such that no less than six supporting legs 38 are disposed between the rim and the footprint of the tire when the tire is deflated and the assembly is subjected to the load that the tire is designed to support. It is believed that for an embodiment of a run-flat insert according to the invention wherein the supporting legs of the run-flat insert are arranged in axially aligned pairs 40, 42 of oppositely inclined legs, there should be at least three pairs of axially aligned supporting legs 40, 42 disposed between the rim 4 and the footprint of the tire 2 when the tire 2 is deflated and the assembly is subjected to the load that the tire is designed to support. The length of the footprint of the tire, measured in the direction that the assembly is traveling may be determined by: (a) manufacturing a tire 2 and rim assembly 4 by mounting the tire 2 on the rim 4 without inflating the tire; (b) applying a load to cause the inner cavity of the tire 2 to have a radial height at the mid-circumferential plane of the tire 2 that is equal to the predetermined maximum diameter of the radially outer surface of the annular band of the run-flat insert; and (c) measuring the length of the footprint of the tire in a direction perpendicular to the axis of rotation of the assembly.

What is claimed is:

1. A run-flat inser for use with a tire and rim assembly, the insert being made from an elastically deformable material and comprising an annular band and a plurality of supporting legs, the supporting legs being at least eight in number, being spaced apart around and embedded in the annular band, and attached to and extending raidally inwardly from the radially inner surface of the annular band, wherein axially-aligned supporting legs extend outwardly in opposite directions with respect to the mid-circumferential plane of the run-flat insert, the circumferential spacing between supporting legs at their radially inner ends being at least 30% of the circumferential width of a supporting leg at its radially inner end, wherein a radially inner portion of each supporting leg has an axially outer surface that is contoured to be complementary to the axially inner surface of a bead portion of a tire, wherein the radially inner end of each supporting leg has a readially inner surface that is inclined at an angle of between 13° and 17° with respect to a line parallel to the axis of rotation of said run-flat insert.

2. The run-flat insert of claim 1 further comprising an axially oriented support member extending between the axially-aligned support legs.

3. The run-flat insert of claim 2 wherein the axially oriented support member is an arch.

4. An assembly of a rim, a tire and a run-flat insert, said assembly comprising:
   (a) a rim having a pair of axially opposed bead seating surfaces with bead retaining flanges extending raidally outwardly from the axially outer end of said bead seating surfaces;
   (b) a tubeless pneumatic tire mounted on said rim, said tire having an inner cavity and a pair of axially opposed bead portions, one of said bead portions being disposed adjacent to each bead seating surface and the respective bead retaining flange of said rim; and
   (c) a run-flat insert disposed within the inner cavity of said tire comprising an annular band having at least four pairs of circumferentially spaced supporting legs integral with the annular band, said annular band and supporting legs comprising an elastically deformable polymeric material, said annular band having radially inner and outer surfaces with said supporting legs extending generally radially inwardly from the radially inner surface of said annular band, each pair of supporting legs having its legs inclined with respect to the axis of rotation of said assembly, said supporting legs having radially inner ends that are disposed adjacent to the bead seating surfaces of said rim axially inwardly of the bead portiosn of said tire, said supporting legs having a circumferential thickness at their radially inner ends such that the circumferential spacing between circumferentially adjacent supporting legs at their radially inner ends is at least 30% of the circumferential thickness of the supporting legs at their radially inner ends, each said supporting leg has a radially inner portion which has a portion of its radially outer surface that is contoured to be complementary to, and is adjacent to an axially inner surface of a bead portion of said tire, and wherein the radially inner end of each supporting leg has a radially inner surface that is inclined at an angle of between 13° and 17° with respect to a line parallel to the axis of rotation of the assembly.

5. An assembly as described in claim 4 or 11 wherein the predetermined maximum diameter of the radially outer surface of said annular band is no greater than D, where $$D=(A^2+B^2)/2$$

where A is the inside diameter of the inner cavity of said tire at the mid-circumferential plane of the tire when it is not mounted, less 25 millimeters; and B is the nominal inside diameter of the bead portions of the tire less 12 millimeters.

6. An assembly as described in claim 9 or 11 wherein the axial width of the annular band of said run-flat insert is greater than 60% of the axial width of a footprint of said tire.

7. An assembly as described in claim 5 wherein the axial width of the annular band of said run-flat insert is greater than 60% of the axial width of a footprint of said tire.

8. An assembly as described in claim 4 or 11 wherein said run-flat insert has a number of pairs of axially aligned supporting legs such that at least three pairs of axially aligned supporting legs are disposed between said rim and the footprint of said tire when the tire is deflated and the assembly is subjected to the load that the tire is designed to support.

9. An assembly as described in claim 5 wherein said run-flat insert has a number of pairs of axially aligned supporting legs such that no less than three pairs of axially aligned supporting legs are disposed between said rim and the footprint of said tire when the tire is deflated and the assembly is subjected to the load that the tire is designed to support.

10. An assembly as described in claim 6 wherein said run-flat insert has a number of pairs of axially aligned supporting legs such that no less than three pairs of axially aligned supporting legs are disposed between said rim and the footprint of said tire when the tire is deflated and the assembly is subjected to the load that the tire is designed to support.

11. The assembly of claim 4 further comprising an axially-oriented support member extending between the axially aligned support legs.

* * * * *